Oct. 5, 1937.  R. E. BROWN  2,094,870
WATER COOLER
Filed Nov. 23, 1936
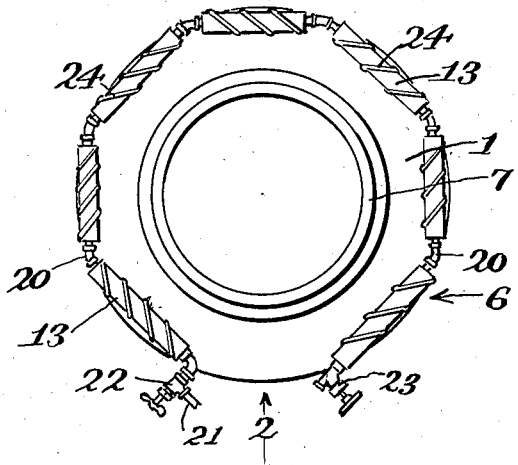
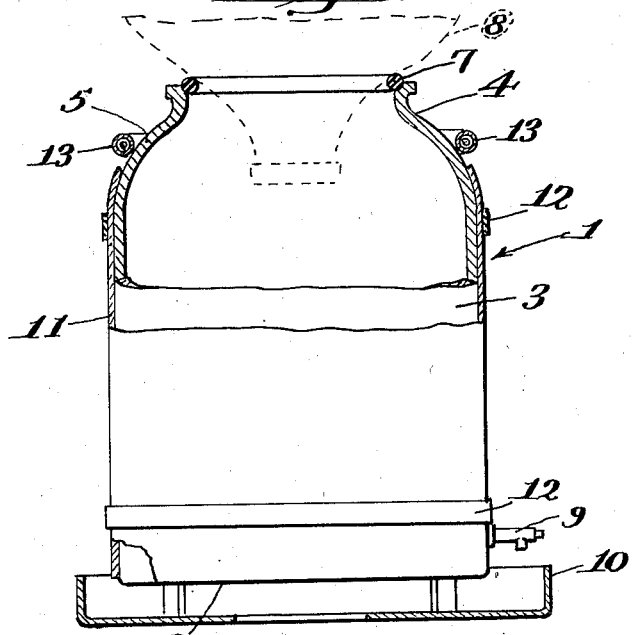
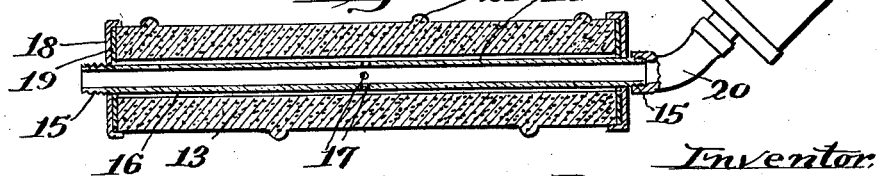
Inventor:
Robert E. Brown
by Hazard and Miller
Attorneys.

Patented Oct. 5, 1937

2,094,870

UNITED STATES PATENT OFFICE 2,094,870

WATER COOLER

Robert Edward Brown, Los Angeles, Calif.

Application November 23, 1936, Serial No. 112,275

5 Claims. (Cl. 62—154)

My invention relates to a water cooler and while of general application, is especially for use with water dispensers such as are used in homes and offices. Water may be supplied to such dispensers either by inverting a glass bottle of water having its neck immersed in the water dispenser or water may be continuously supplied by a valve controlled means from a source of water under pressure. Unless such water is pure the water dispensers generally contain water purification means. The water dispensers include usually a water container having porous clay walls which by evaporation cools the water within the container or other means are used for cooling the water in the container. Sometimes the porous clay container is combined with additional cooling means.

The present invention relates to water cooling means for a water dispenser in which a porous fibrous jacket tightly embraces the side walls of the water container and water is supplied at spaced points at the upper end of the jacket uniformly moistening the same, the evaporation of the water of the jacket producing the cooling effect. The present invention has for its object to provide simple, inexpensive and efficient means which may be easily controlled for supplying the water to the cooling jacket.

With the above and other objects in view which will appear as the description proceeds, my invention consists in the construction and arrangement of parts hereinafter described and claimed.

In the accompanying drawing forming a part of the specification, I have illustrated a preferred embodiment of my invention, and in which:

Fig. 1 is a top plan view of a water dispenser provided with my water cooler.

Fig. 2 is a side elevation partly in section taken in the direction of the arrow 2 of Fig. 1.

Fig. 3 is an enlarged longitudinal, vertical cross section of one of the water distributing units showing in elevation the connection to an adjacent unit.

Referring to the drawing, 1 indicates a water container having a bottom wall 2, cylindrical side walls 3 and a constricted opening 4 at the top providing a shoulder 5 to support a plurality of water distributing units which are indicated at 6. 7 is a gasket resting on the mouth of the container 1 against which rests the inverted bottle 8 indicated in dotted lines in Fig. 2.

The water container is provided with the usual faucet 9. 10 is a drip pan disposed below the container 1. Tightly embracing the side walls 3 of the container is a cooling jacket 11, made of suitable porous material such as blotting paper and the same is firmly held in position by means of a pair of metal bands 12 encircling the same.

The water distributing means consists of a plurality of cylindrical tubes 13 which in the present instance are shown as seven in number which form a polygon approaching a circle and rest upon shoulder 5 of the water container. Each hollow cylinder is made of porous material such as hard-burned porous clay, and through the whole length thereover extends a metal tube 14 having its ends threaded at 15 and projecting from opposite ends of the cylinder 13. As clearly shown in Fig. 3, the tube 14 is spaced from the interior walls of the clay cylinder 13 providing a water chamber 16 to which water is supplied through perforations 17 in tube 14. The ends of the clay cylinders 13 are made fluid tight by means of screw caps 18 provided with gaskets 19. Each cylinder 13 is connected to an adjacent cylinder by means of a tubular connection 20 which is screw threaded to adjacent ends 15 of tubes 14. It will be seen that the cylinders 13 are connected in series in this manner and water under pressure is supplied to the free end of one of the cylinders 13 by means of a pipe 21 provided with a regulating valve 22. The other free end of the series of the cylinders 13 is provided with a valved outlet 23. Each cylinder 13 is provided on its outer periphery with a helical water distributing rib 24.

Operation

Water is supplied through pipe 21 which may be connected to the city water system and valve 22 is opened, allowing the water to pass through the tubes 13 arranged in series as described and out through the valved outlet 23. A pressure gauge may be attached to the valved outlet 23 and the regulating valve 22 manipulated until the desired pressure is indicated at the pressure gauge. Outlet valve 23 is now closed and the water in water chamber 16 of each cylinder 13 will percolate through the porous wall of the cylinder and flow along the outer periphery, collecting on the lower portions of the helical ribs 24 which will result that water will drip from the lowest points thereof onto the cooling jacket 11. The maximum cooling effect will be achieved by so regulating the water supply to cylinders 13 that the water percolated therethrough and supplied to the cooling jacket 11 will maintain the same in a moist condition at all times with little or no water dripping therefrom into the drip pan 10.

The water distributing unit 6 may be flushed out periodically to remove any sediment deposited on the interior walls of the porous cylinders by opening the valved outlet 23. The rapid flow of water through tubes 14 will cause the water in water chambers 16 to be agitated and drawn through perforations 17 of tubes 14 and out through the outlet.

Various changes may be made in the construction and combination of parts of my water cooler by those skilled in the art without departing from the spirit of the invention.

I claim:

1. A water cooler comprising a water container having a bottom, side walls and a constricted opening on top providing a shoulder, a porous cooling jacket, means to hold the jacket in contact with the side walls, a plurality of porous hollow clay cylinders forming water distributing units and disposed on said shoulder, each cylinder having on its periphery a helical rib for collecting and conducting water to the upper end of the cooling jacket and valve controlled means to supply water under pressure to the water distributing units, each cylinder being closed at the ends and provided with a perforated tube spaced from the interior walls of the cylinder, the cylinders being connected in series by a tubular connection between ends of adjacent cylinders.

2. A water cooler comprising a water container having a bottom, side walls, and a constricted opening on top providing a shoulder, a porous cooling jacket closely embracing the side walls and a plurality of porous hollow cylinders connected in series and disposed on said shoulder, each cylinder being closed at the ends and provided with the perforated tube extending through the length of the cylinder and spaced from the interior walls thereof and valve controlled means for supplying water under pressure to one end of said series and a valved outlet at the other end of the series.

3. A water cooler comprising a water container having a bottom, side walls, and a shoulder at the top of porous material embracing the side walls and means for distributing water at spaced points to the upper end of the cooling jacket, said water distributing means including a plurality of hollow porous cylinders, each cylinder being closed at its ends and a tube spaced from the interior walls of the cylinder and provided with perforations extending lengthwise through each cylinder, adjacent ends having tubular connections and means to supply water under pressure to the water distributing units.

4. A water cooler comprising a water container having a bottom, side walls, and an opening at the top, a cooling jacket made of porous sheet embracing the side walls and means to distribute water at spaced points to the upper end of the cooling jacket, said water distributing means including a plurality of tubularly connected hollow porous cylinders and valve controlled means for supplying water under pressure to the water distributing means.

5. A water cooler comprising a water container having side walls, a cooling jacket made of a porous sheet embracing the side walls and means for distributing water to the upper end of the cooling jacket, said water distributing means including a plurality of porous cylinders tubularly connected in series and valve controlled means for supplying water under pressure to the water distributing means.

ROBERT E. BROWN.